Figures 1, 2, 3:
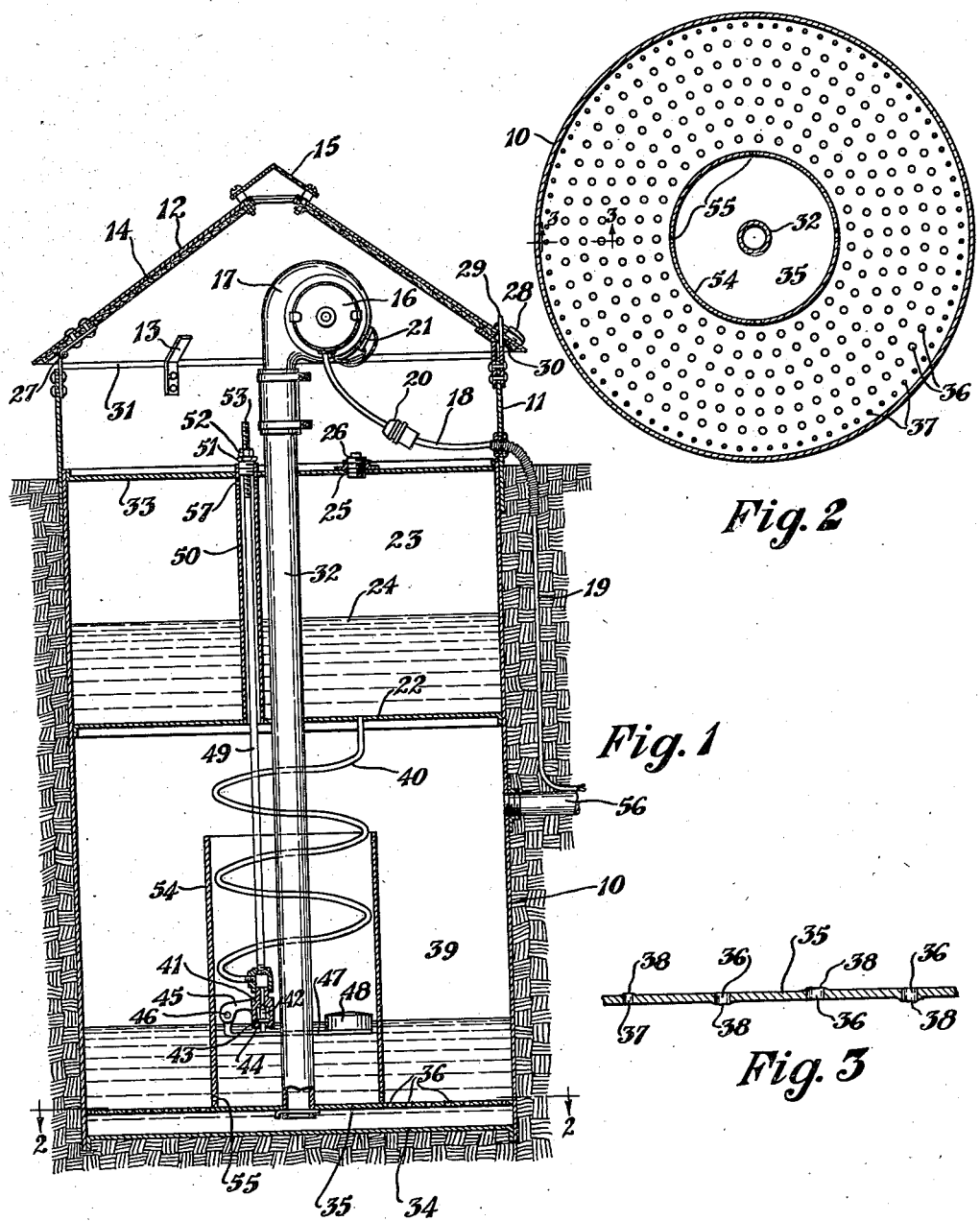

July 28, 1936.　　R. W. SNETHKAMP　　2,049,333
GAS PLANT
Filed July 26, 1934

Inventor
R. W. Snethkamp
By Freast and Bishop
Attorneys

Patented July 28, 1936

2,049,333

UNITED STATES PATENT OFFICE 2,049,333

GAS PLANT

Ralph W. Snethkamp, Champion Heights, Ohio

Application July 26, 1934, Serial No. 737,051

4 Claims. (Cl. 261—122)

The invention relates to apparatus for generating gas for cooking or heating purposes from gasoline or other light hydrocarbons, and is especially adapted for use in rural districts where manufactured or natural gas is not obtainable, the invention contemplating the provision of apparatus for generating from the gasoline or the like the gas which may be piped into the ordinary gas system such as commonly used in a residence or the like whereby the generated gas may be burned in a cooking stove, heating stove or any other apparatus designed for consumption of natural or manufactured gas.

The object of the improvement is to provide a steel tank or drum adapted to hold a supply of gasoline, means being provided for forcing air under pressure through the gasoline to mix the air with the gasoline utilizing or vaporizing a portion of the liquid gasoline and carrying the same away from the tank or drum mixed with the air in such proportion that it may be easily and readily burned in a gas cooking stove or heating stove or the like such as ordinarily used for burning either natural or manufactured gas.

Another object is to provide a perforated partition wall below the level of the gasoline, air under pressure being forced through the gasoline and through said perforated partition wall to vaporize a portion of the gasoline and cause the same to mix with the air.

A further object of the improvement is to provide burrs on alternate sides of adjacent apertures in said plate whereby the air bubbles are torn apart causing the air to more intimately mix with, and vaporize the gasoline.

A still further object is to provide a flexible coil pipe for conveying gasoline by gravity from the reservoir chamber in the tank or drum to the vaporizing or mixing chamber, a float valve controlling the gasoline fed from the reservoir to the mixing chamber.

Still another object of the improvement is to provide means for quickly and easily adjusting the height of the float valve within the mixing chamber so as to control the flow of gasoline from the reservoir to the mixing chamber.

Another object of the invention is to provide a standpipe surrounding the float valve in the mixing chamber to prevent turbulence in the gasoline therein from causing the float valve to operate so as to permit too much gasoline being fed from the reservoir to the mixing tank.

The above and other objects which may be later pointed out or which will be apparent from an inspection of the drawing and the following detail description may be attained by constructing the improved apparatus in the manner illustrated in the accompanying drawing in which Figure 1 is a vertical sectional view of a gas plant constructed in accordance with the invention;

Fig. 2, a transverse sectional view through the mixing chamber of the tank showing the perforated partition plate, taken as on the line 2—2, Fig. 1; and Fig. 3, an enlarged detail sectional view through a portion of the perforated plate taken as on the line 3—3, Fig. 2.

Similar numerals refer to similar parts throughout the drawing.

The improved apparatus is enclosed within a steel drum or tank, preferably of about fifty gallon capacity, as indicated generally at 10, this drum or tank being preferably covered with tar and buried in the ground as clearly shown in Figure 1.

A housing 11 may be provided above the ground level attached to the upper end of the drum and provided with a conical cover 12 supported slightly spaced above the housing as by the brackets 13 and lined with any suitable heat insulating material as indicated at 14, a ventilator 15 being preferably located at the top of said cover.

The motor 16 and blower fan 17 driven thereby are located within the housing, a suitable electric wiring as shown at 18 leading to the motor and preferably enclosed in a casing 19 of lead or the like located under ground and leading to any suitable source of electric energy preferably within the house. A connector plug 20 may be provided in the electric wiring within the housing 11 and for the purpose of preventing or minimizing radio interference with the motor, a condenser 21 of any usual and well known design may be provided therein.

A partition wall 22 is located within the drum or tank at a point preferably above the center thereof, forming a reservoir chamber 23 for containing a supply of gasoline as indicated at 24. A filling opening 25 is provided in the upper end of the reservoir through which gasoline may be poured into the reservoir, and a plug 26 may be provided for normally closing said opening.

As will be seen from an inspection of Figure 1, the cover 12 is removably supported above the housing 11, and may be hinged at one side as indicated at 27, a padlock 28 or the like being provided for securing the other side of the cover to a rod 29 carried by the housing and passing through an aperture 30 in the cover. An opening 31 is thus provided between the housing and cover through which air may be drawn by the blower fan 17.

A pipe 32 preferably of about 1¼ inches in diameter is connected to the discharge side of the blower fan 17 and extends downward through the center of the drum entirely through the top wall 33 and partition wall 22, a tight joint being provided at each of these points. This pipe extends to a point approximately one inch from the bottom wall 34 of the tank or drum, and a sheet metal disk or partition wall 35 is attached to the lower end portion of this pipe. This disk or partition wall 35 has a fairly close fit to the inside of the drum as indicated in the drawing.

The disk or partition wall 35 has an imperforate central portion, but the outer portion thereof is provided with a large number of small apertures indicated generally at 36, the outer row 37 of the apertures being preferably of considerably less diameter and more closely spaced than the apertures 36.

As is best shown in Figure 3 of the drawing, both the apertures 36 and 37 are provided on alternate sides of the plate with burrs 38 provided for a purpose which will be hereinafter described in detail.

The gasoline is adapted to be conveyed by gravity from the reservoir chamber 23 to the mixing chamber 39 through a flexible tubing 40 of copper or the like, extending through the partition wall 22, and preferably coiled around the center pipe 32 as shown in Fig. 1, the lower end thereof communicating with and supporting the valve casing 41 within which is located a gravity operated needle float valve 42.

This needle valve may be provided with a fixed collar or enlargement 43 adapted to engage the lower end 44 of the valve casing 41 so as to limit the opening movement of the valve.

A lug 45 may be formed upon the valve casing 41 to which may be pivoted as at 46 the float arm 47 carrying a float 48 at its free end whereby the liquid level in the mixing chamber 39 may be maintained substantially uniform at all times.

For the purpose of adjusting the height of the needle valve within the mixing chamber, an adjusting rod 49 may be connected to the valve casing 41 and extended upward through a tube 50, sealed at its upper and lower ends to the top wall 33, and partition wall 22, a packing nut 51 being provided at the upper end of said tube tightly closing the same and an adjusting nut 52 being provided upon the threaded upper end 53 of the rod for holding the same in adjusted position. The rod of course, is threaded through the packing nut 51 so that any desired vertical adjustment of the needle valve may be provided.

In order to prevent any considerable turbulence in the gasoline in the mixing chamber when a considerable amount of gas is being withdrawn therefrom, a standpipe 54 may center the float valve and coil 40 extending upward from the imperforate central portion of the disk or plate 35 and preferably having two or three small apertures 55 in its side wall about an inch above the mixing disk or plate 35. This standpipe is soldered or otherwise sealed to the mixing disk.

In the operation of the apparatus, air is sucked in through the opening 31 by the fan 17 and forced downward through the pipe 32 and through the gasoline below the mixing disk or plate 35. The air mixes with the gasoline below and as it passes through the apertures in the mixing disk or plate and the burrs 38 on alternate sides of the plate tend to tear up the air bubbles and cause the air to mix more thoroughly with the gasoline, making a richer mixture of gas.

The air which passes outward past the apertures 36 will pass upward through the outer row of apertures 37. The gasoline is vaporized and mixed with the air in the mixing chamber and withdrawn therefrom through the pipe 56 which leads to the house and may be piped into any gas stove or heater of usual and ordinary construction.

High test gasoline is used in the apparatus, and it has been found that in extremely cold weather the addition of a small amount of what is commonly known as casing head gasoline will produce a hotter flame in the burners.

A steady pressure of air is essential to the proper operation of the apparatus, but it is not necessary that the pressure be very great, therefore the blower motor 16 may be quite small so as to build up pressure of only a few ounces. Therefore, there is no danger of excessive pressure. In order to balance up the pressure within the reservoir 23 and mixing chamber 39, a few small apertures 57 may be provided in the upper portion of the tube 50.

For the purpose of taking care of condensation of gas the pipe 56 should be laid so that there will be a natural drainage back to the drum. If it is impossible to so arrange the pipe because of the terrain, then a trap should be located at the lowest point available in the pipe line so that all portions of the pipe line will drain thereto.

By burying the drum in the ground it has been found that the temperature therein is maintained more nearly uniform during operation of the apparatus.

To obtain the best results, it is advisable to replace the ordinary mixture adjustment lock screws on the burners of the gas stove with friction washers which may be slightly adjusted to give a good blue flame without the use of tools.

I claim:

1. A gas plant including a tank having an upper reservoir chamber and a lower mixing chamber, a coiled, flexible gasoline feed pipe leading from the reservoir chamber to the mixing chamber, a float valve at the lower end of said feed pipe, a perforate mixing plate below the gasoline level in the mixing chamber, a standpipe fixed to the mixing plate and surrounding the float valve, means for flexing said pipe to adjust the level of said float valve, a blower pipe connected to said mixing plate and open at its lower end, and a gas outlet pipe communicating with the mixing chamber above the gasoline level thereof.

2. A gas plant including a tank having an upper reservoir chamber and a lower mixing chamber, a gasoline feed pipe leading from the reservoir chamber to the mixing chamber, a float valve at the lower end of said feed pipe, a mixing plate below the gasoline level in the mixing chamber having a perforate portion and an imperforate portion, and a standpipe fixed to the imperforate portion of the mixing plate and surrounding said float valve.

3. A gas plant including a tank having an upper reservoir chamber and a lower mixing chamber, a gasoline feed pipe leading from the reservoir chamber to the mixing chamber, a float valve at the lower end of said feed pipe, a mixing plate below the gasoline level in the mixing chamber, a blower pipe connected to said mixing plate and open at its lower end, a standpipe fixed to the mixing plate and surrounding the float valve, the mixing plate being perforated beyond said standpipe, and a gas outlet pipe communicating with the mixing chamber above the gasoline level thereof.

4. A gas plant including a tank having an upper reservoir chamber and a lower mixing chamber, a mixing plate below the gasoline level in the mixing chamber having an imperforate central portion and a perforate outer portion, a standpipe fixed to the imperforate portion of the mixing plate, a coiled, flexible gasoline feed pipe leading from the reservoir chamber to the mixing chamber, a float valve at the lower end of said feed pipe and located within said standpipe, an adjusting rod for flexing said pipe to adjust the level of said float valve, a blower pipe located through said standpipe and connected to said mixing plate and open at its lower end, and a gas outlet pipe communicating with the mixing chamber above the gasoline level thereof.

RALPH W. SNETHKAMP.